US005477097A

United States Patent [19]
Matsumoto

[11] Patent Number: 5,477,097
[45] Date of Patent: Dec. 19, 1995

[54] ELECTROSTATIC MICRO-ACTUATOR

[75] Inventor: Hirofumi Matsumoto, Ushiku, Japan

[73] Assignee: Nippon Mektron, Ltd., Tokyo, Japan

[21] Appl. No.: 251,782

[22] Filed: May 31, 1994

[30] Foreign Application Priority Data

Oct. 20, 1993 [JP] Japan .................................. 5-286133

[51] Int. Cl.⁶ .................................................. H02N 1/00
[52] U.S. Cl. ................................................................ 310/309
[58] Field of Search ............................................... 310/309

[56] References Cited

U.S. PATENT DOCUMENTS

| 5,001,381 | 3/1991 | Watanabe | 310/309 |
| 5,239,222 | 8/1993 | Higuchi et al. | 310/309 |
| 5,367,429 | 11/1994 | Tsuchitani et al. | 361/280 |

FOREIGN PATENT DOCUMENTS

| 4234969 | 4/1993 | Germany | 310/309 |
| 3022886 | 1/1992 | Japan | 310/309 |
| 4285478 | 10/1992 | Japan | 310/309 |
| 5111264 | 4/1993 | Japan | 310/309 |

*Primary Examiner*—Thomas M. Dougherty
*Attorney, Agent, or Firm*—Chilton, Alix & Van Kirk

[57] ABSTRACT

This invention provides an electrostatic micro-actuator whose movable element can keep stable motion even at a low speed by sealing a high viscosity fluid having a high dielectric constant between the movable element and fixed electrodes and by shaping the movable element so as to be stable in the fluid.

The electrostatic micro-actuator according to the present invention employs a fundamental construction wherein the high viscosity fluid is sealed between the movable element and the fixed electrodes, and the movable element is shaped so as to be stable in the fluid, so that the movable element keeps stable motion even at a low speed. When combined with one another in parallel and in series, such electrostatic micro-actuators can easily constitute a macro-system useful for various fields of applications.

19 Claims, 3 Drawing Sheets

ELECTROSTATIC MICRO-ACTUATOR

BACKGROUND OF THE INVENTION

1. Field of the Invention

This invention relates to an electrostatic micro-actuator in which the motion of a movable element is remarkably stabilized by sealing a high viscosity fluid between two electroded fixed members, the high-viscosity fluid surrounding a movable element.

2. Description of the Prior Art

Electronic/electrical devices using static electricity as driving force have hardly been developed so far. For, the energy density is incomparably low in comparison with electronic/electrical devices using electromagnetism.

It has been found recently that this drawback can be compensated by miniaturizing the device itself to a micro-size. Accordingly, attempts have now been made to utilize static electricity as the driving source of a micro-actuator. However, means for achieving the stability in a system is necessary because the system utilizing static electricity essentially involves unstability of motion according to the Earnshaw's theorem.

Various methods have been proposed so as to stabilize the system against the Coulomb force acting in the direction perpendicular to the direction of the movement of the movable element inside an electrostatic micro-actuator.

By one of them, for example, mechanical bearings are provided. However, feasibility as well as reliability of this method drop with miniaturization of the size of the system. There is another method using magnetic levitation but the magnetic force itself is not an effective force in a micro-range. In this point, a method utilizing the Meissner effect of a super-conducting material can be an essentially useful means but the problem of the high cost of production brings up because liquid helium or liquid nitrogen, must be prepared. Still another method utilizes ultrasonic wave levitation. However, since the wavelength is in the order of several millimeters, there is a limitation to miniaturization of the system to the micro-size.

SUMMARY OF THE INVENTION

The present invention provides an electrostatic micro-actuator such that the movable element can be stably moved even at a low speed of below 10 mm/sec by sealing a high viscosity fluid having a high dielectric constant between two fixed members which support electrodes, the high-velocity fluid surrounding the movable element and by shaping the movable element so as to be stable in the fluid when moving.

To accomplish the object described above, an electrostatic micro-actuator according to the present invention has a basic structure wherein a high viscosity fluid is sealed between two fixed position electrode containing or supporting members, the high-viscosity fluid surrounding the movable element and the movable element is shaped so as to have fluid stability so that the movable element can stably move even at a low speed.

Combining them with one another in parallel and in series, such an electrostatic micro-actuator can easily constitute a macro-system useful for various applications.

DESCRIPTION OF THE PREFERRED EMBODIMENTS

Hereinafter, the present invention will be explained in further detail with reference to the accompanying drawings. In an electrostatic micro-actuator according to the present invention, a high viscosity fluid having a high dielectric constant is sealed between two electroded fixed members, the high-viscosity fluid surrounding a movable element and the movable element is shaped so as to be stable in the fluid so that even when the speed of the movable element is not high, the movable element can be stably held.

In the case of, for example, the head of a hard disk drive, the stable state of the head is relatively established by levitating the head even in the air having a low viscosity by increasing the rotating speed of the disk. According to the present invention, dynamic stability of the movable element in the electrostatic micro-actuator is substantially equivalent to the stability of the head of the hard disk drive, by keeping the Reynolds number of the system within a stable range.

When, for example, the speed of the movable element is from 1 to 10 mm/sec, and the coefficient of kinematic viscosity is $10^{-3}$ m$^2$/sec, the Reynolds number inside the system becomes sufficiently smaller than a critical Reynolds number (approximate 1000) when the gap is below a 100 μm order. It has thus been clarified that the flow is a laminar flow sufficiently inside the gap and dynamic stability of the movable element can be secured.

Figure 1:
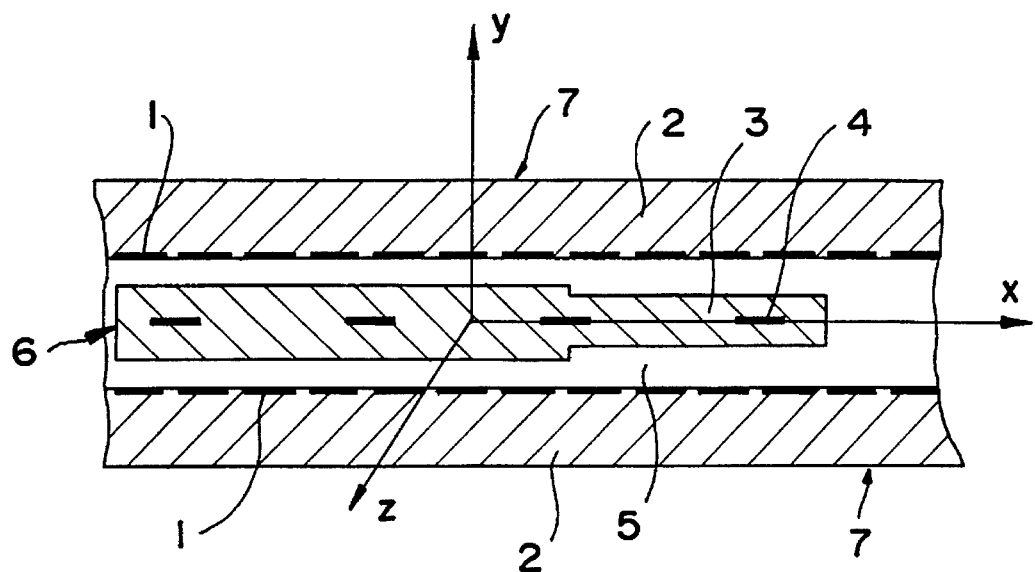
FIG. 1 is an explanatory view schematically showing the structure of an electrostatic micro-actuator according to the present invention.

FIG. 1 is an explanatory view schematically showing the structure of an electrostatic micro-actuator according to the present invention. Each of the fixed members 7 comprises a plurality of fixed electrodes 1 and an electrical insulating layer 2. Each fixed electrode 1 is fixedly disposed on one of the surfaces of the electrically insulating layer 2. The two fixed members 7 are disposed in parallel with each other with a predetermined gap between them in such a manner that their fixed electrodes 1 oppose one another, and a movable element 6 is provided between these mutually opposing fixed electrodes 1. The movable element 6 has a plurality of movable element electrodes 4 embedded in the electrically insulating layer 3. A high viscosity fluid 5 having an insulating property such as a silicone oil or a fluorine oil is sealed into the gap between the opposed fixed electrodes 1 in which the movable element 6 is provided.

Figure 2:
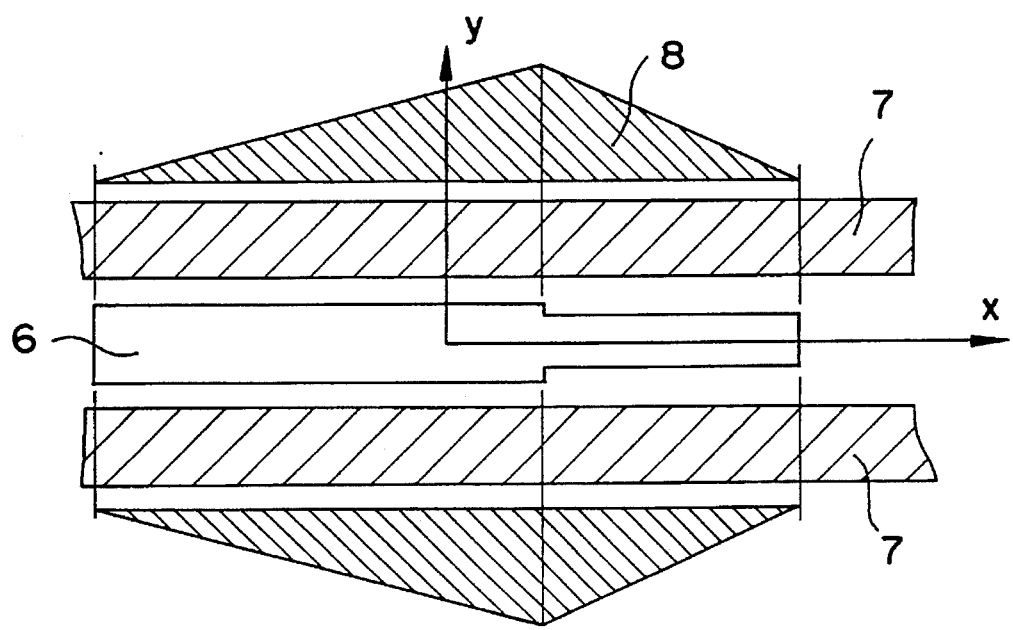
FIG. 2 is a pressure distribution diagram of a two-dimensional model according to the present invention.

The movable element 6 has a stepped shape or a tapered shape so that a positive fluid-pressure distribution is established between the fixed electrodes 1 and the movable element 6. In this way, a dynamic fluid-pressure levitation effect can be expected. The fluid-pressure produced in the gap between the fixed electrodes 1 and the movable element 6 when the movable element 6 has a shape of stepped sheet is shown in FIG. 2. In a two-dimensional model, the area of the triangle indicated by oblique lines represents the total fluid-pressure which acts on one of the surfaces of the movable element 6 as a fluid-pressure distribution 8. This total fluid-pressure is a function of the space size. The smaller the gap, the greater becomes the total fluid-pressure in the system.

This qualitative phenomenon can be construed as follows. When the movable element 6 approaches one of the upper and lower fixed electrodes 1, a force tending to push back the movable element 6 to its equilibrium position acts on the movable element 6. Therefore, this phenomenon is advantageous to the system stabilization. However, the restoring force in this case must essentially exceed the Coulomb force acting between the electrodes 4 of the movable element 6 and the fixed electrodes 1. However, the restoring force which is the resultant force of the damping force and the dynamic levitating force increases drastically as the gap size becomes qualitatively smaller, so that the restoring force becomes incomparably greater than the Coulomb force in the proximity of each fixed electrode 1. Accordingly, it is considered that in the case of a micro-system, this essential condition is naturally satisfied in most cases.

Figure 3:
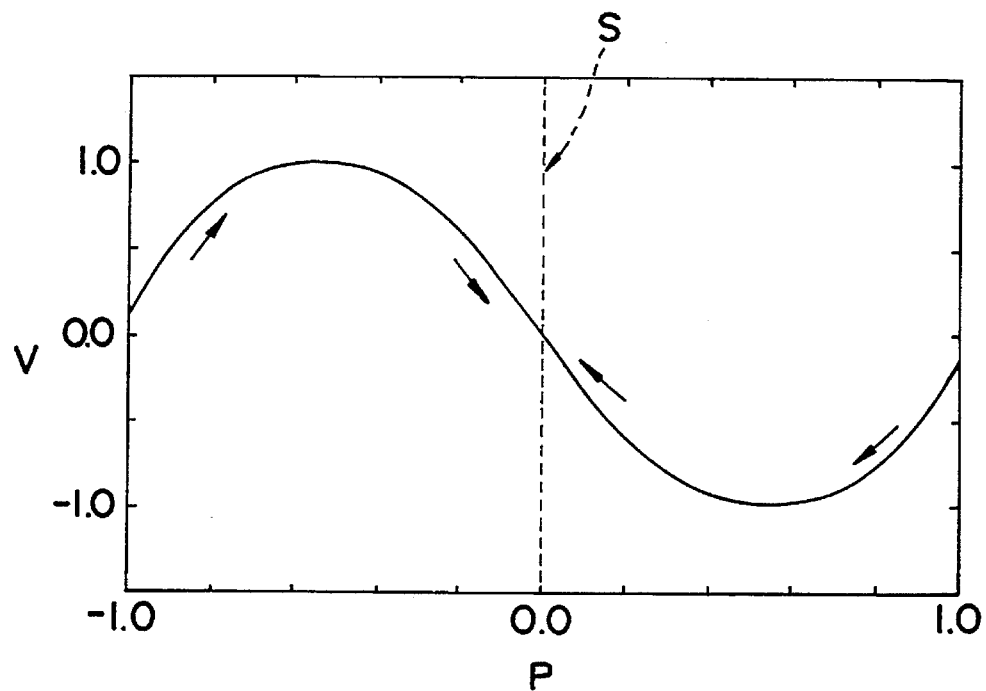
FIG. 3 is a phase-plane diagram showing a qualitative phenomenon of the motion of a movable element.

FIG. 3 is a phase/plane diagram which is intended to probe the qualitative phenomenon of motion of the movable element 6 by a stability theory. As the condition of analysis in this diagram, the size of the movable element 6 is 30 mm by 40 mm, the mean gap size is 70 μm, the viscosity of the fluid 5 is 0.8 Pas and the speed of the movable element 6 is 1 mm/sec. The axis of abscissa P of FIG. 3 has no dimension and represents the position of the movable element 6, and the axis of ordinate has no dimension and represents the speed of the movable element 6. The dash line S at the center represents the equilibrium position of the movable element 6.

This diagram shows a qualitative state such that when the movable element 6 moves in the −Y direction, it move at a speed in the +Y direction, and when the movable element 6 moves in the +Y direction, it moves at a speed in the −Y direction. Accordingly, the diagram represents that the motion of the movable element 6 can be stabilized because the movable element 6 during its motion is always positioned at the equilibrium position.

Figure 4:
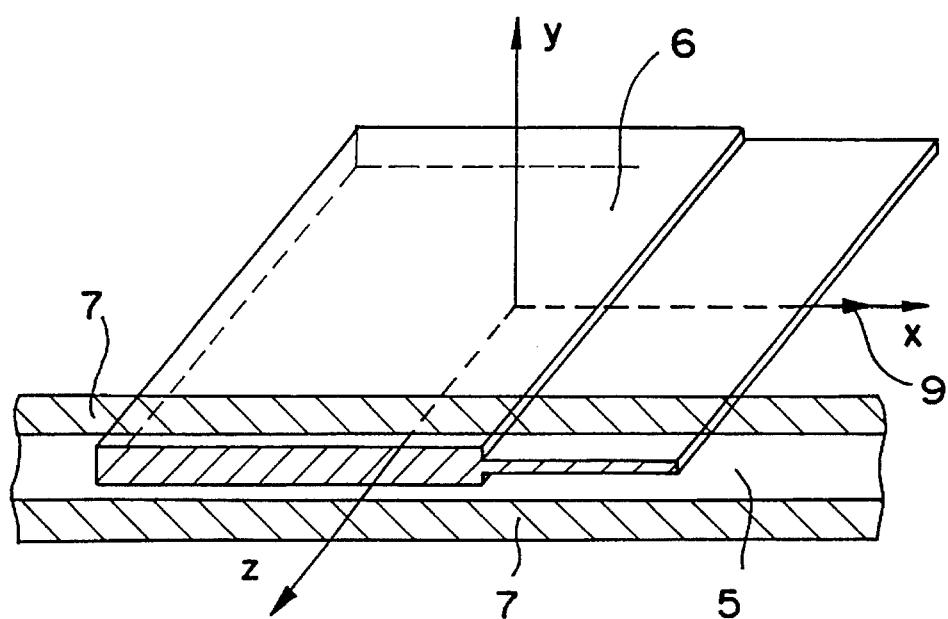
FIG. 4 is an appearance view of an example of the movable element.

FIG. 4 is an appearance view showing an example of the movable element 6. In the case of this example, the movable element 6 has a sheet-like stepped shape so that it can move in the rightward direction 9, but a taper shape or a corrugation shape can also be adopted so long as it is stable in fluid. Furthermore, the movable element 6 can have a laterally symmetrical shape so as to move reciprocatingly not in a specific direction.

Figure 5:
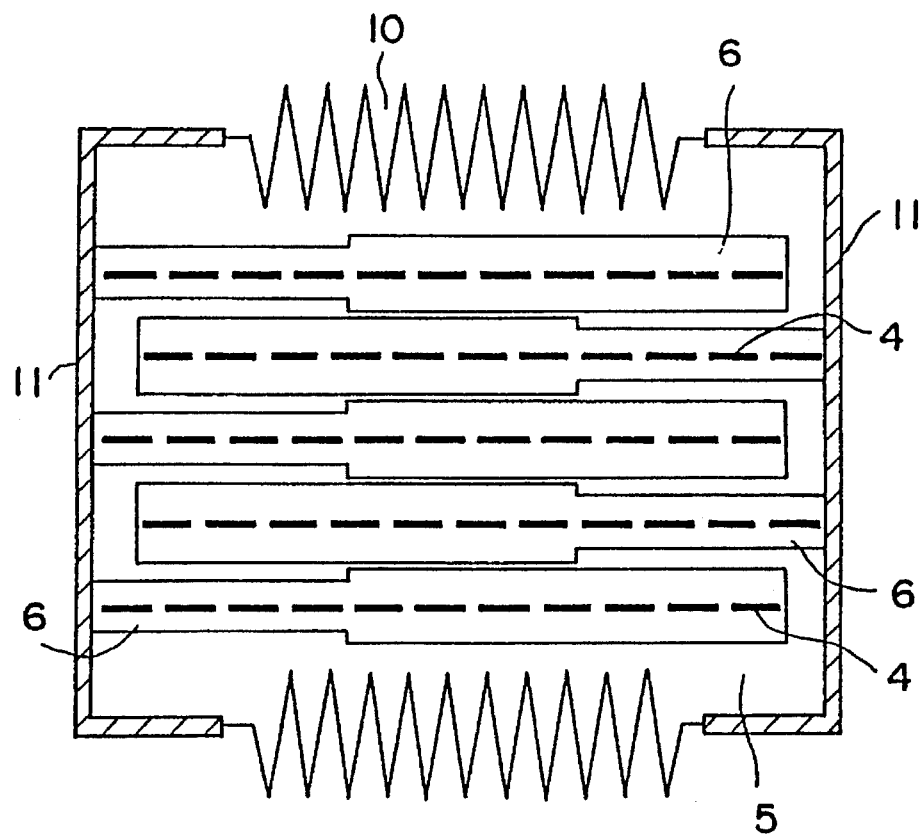
FIG. 5 is a view schematically showing a model of an artificial muscle to which the present invention is applied.

FIG. 5 is a view schematically showing a model of an artificial muscle to which the present invention is applied. In this model, a large number of electrode bearing or supporting members 6 as a sub-system are juxtaposed in such a manner as to move in mutually opposite directions, and the members 6 in the same direction come into contact with respective right and left housing members 11. The housing members 11 are connected to spring components 10 disposed at upper and lower portions and constitute a macro-system the scale of which increases with the number of sub-systems having the generation force thereof connected to one another. The high viscosity fluid 5 is sealed into the space between these constituent members.

In this electrostatic micro-actuator, the muscular structure is under the muscle expansion state during the operation of the actuator, and the energy is stored in the spring components 10. When the actuator operation stops, the energy stored in the spring components 10 is released, each electrode support member 6 returns to its initial state, and the muscle contraction state is set up.

During this repeatable operation, the electrode support members 6 receive mutually the repulsive working forces due to their step shape and keep their respective positions. Accordingly, it is possible to avoid the unstable motion which is caused due to mutual attraction of the movable elements 6 by the Coulomb forces.

Figure 6:
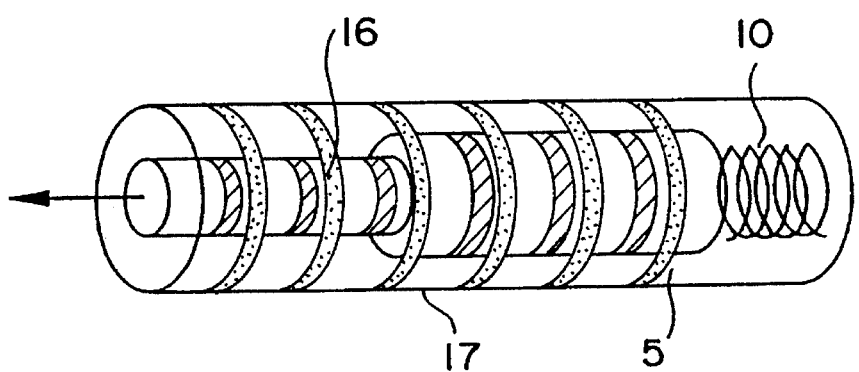
FIG. 6 is view schematically showing another model of an artificial muscle to which the present invention is applied.

FIG. 6 is another model of an artificial muscle to which the present invention is applied. In the embodiment shown in the drawing, a movable element 16 has a stepped cylindrical shape, and fixed electrodes are disposed on the inner surface of a cylindrical fixed member 17, in which the high viscosity fluid 5 is sealed, in such a manner as to encompass the cylindrical movable element 16. The spring component 10 is disposed at the right end of the movable element 16.

In this electrostatic micro-actuator, the movable element 16 is always kept in the equilibrium position against the Coulomb force generated between the cylindrical movable element 16 and the surrounding fixed electrodes, and the movable element 16 moves only in its longitudinal direction. Since this micro-actuator is analogous to a muscular weight comprising myosin and actin that constitute the muscles of living bodies, an artificial muscle can be accomplished by combining these micro-actuators in parallel and in series.

The electrostatic micro-actuator according to the present invention does not require complicated electrical control of motion of the movable element and associated components such as mechanical bearings, but can reliably achieve stabilization of motion of the movable element by utilizing a high viscosity fluid as the fluid bearing. Accordingly, the electrostatic micro-actuator can easily function as an integrated sub-system.

When combined in parallel and in series, the electrostatic micro-actuators can be applied to medical equipment, cameras, artificial muscles, and so forth.

Furthermore, the electrostatic micro-actuator of the present invention does not need any external control for stabilizing the movable element but open control can be accomplished. Therefore, the micro-actuator can be independent as a sub-system, and because the size of this sub-system can be further miniaturized easily, stabilization of motion of the movable element can be reliably attained.

What is claimed is:

1. An electrostatic micro-actuator comprising:
    a. a first electrically insulating fixed member having a plurality of electrodes and at least one substantially planar surface;
    b. a second electrically insulating fixed member having a plurality of electrodes and at least one substantially planar surface, said second fixed member planar surface being oriented in substantially parallel relation to said first fixed member planar surface such that said substantially planar surfaces of said first and second fixed members face each other to define a predetermined gap therebetween;
    c. an electrically insulating movable element disposed within said gap defined by said first and second fixed members,
        (i) said movable element being induced to substantially linear motion by Coulomb forces acting between said first and second fixed member electrodes, the direction of said linear motion being substantially parallel to said planar surfaces,
        (ii) said movable element having at least one first portion and at least one second portion, the average thickness of said first portion being less than the width of said gap defined by said first and second fixed members and being greater than the average thickness of said second portion, said thicknesses being measured perpendicular to the direction of movement of said movable element, surface areas of said movable element which interconnect said first and second portions defining reaction surfaces; and (d) a fluid having a high dielectric constant sealed within said gap defined by said first and second fixed members, said fluid surrounding said movable element, said fluid having a high-viscosity and cooperating with said movable element reaction surfaces during movement of said movable element to produce laminar flow of said fluid whereby the motion of said movable element is stabilized.

2. The electrostatic micro-actuator of claim 1 wherein said reaction surfaces are substantially planar surfaces that face substantially perpendicular to the direction of movement of said movable element.

3. The electrostatic micro-actuator of claim 1 wherein said reaction surfaces diverge outwardly from said movable element second portion to said first portion, said diverging surfaces being at least in part angularly inclined with respect to the direction of movement of said movable element.

4. The electrostatic micro-actuator of claim 1 wherein said high-viscosity fluid is a silicon oil.

5. The electrostatic micro-actuator of claim 1 wherein said high-viscosity fluid is a fluorine oil.

6. The electrostatic micro-actuator of claim 1 wherein said movable element further comprises a third portion located between each of said first and second portions, the thickness of said third portion being tapered from said first portion to the thickness of said second portion, the surfaces of said third portion comprising said reaction surfaces of said movable element.

7. An electrostatic micro-actuator comprising:

a. a first housing member having at least a first side and an end;

b. a second housing member having at least a first side and an end;

c. resilient means connecting said sides of said first and second housing members whereby a deformable chamber is defined by said first and second housing members and said resilient means;

d. a plurality of electrode support members disposed in substantially parallel relation to each other within said chamber,
 (i) each of said support members having a plurality of electrodes;
 (ii) said support members being induced to substantially linear motion by Coulomb forces acting between the electrodes adjacent of said support members;
 (iii) each of said support members also having at least one first portion and at least one second portion, the average thickness of said first portion being greater than the average thickness of said second portion, said thicknesses being measured perpendicular to the direction of movement of said support members, the surface areas of said support members which interconnect said first and second portions defining reaction surfaces;
 (iv) said support members being alternated in said chamber such that said first portion of each support member is located adjacent to a said second portion of at least one other support member, and said second portion of each support member is located adjacent to a said first portion of at least one other support member whereby adjacent of said support members are induced to move in opposite directions;
 (v) said support members also having oppositely disposed first and second ends, one of said ends of each said support member contacting an end of a said housing member whereby said induced motion is transmitted to said housing members; and e. a fluid having a high dielectric constant sealed within said chamber, said fluid surrounding said movable elements, said fluid having a high-viscosity and cooperating with said reaction surfaces during movement of support members to produce laminar flow of said fluid whereby the motion of said support members is stabilized.

8. The micro-actuator of claim 7 wherein said reaction surfaces are substantially planar surfaces that face substantially perpendicular to the direction of movement of said support members.

9. The micro-actuator of claim 7 wherein said reaction surfaces diverge outwardly from said second portion to said first portion of each said support member, said diverging surfaces being at least in part angularly inclined with respect to the direction of induced movement of said support members.

10. The micro-actuator of claim 7 wherein said high-viscosity fluid is a silicon oil.

11. The micro-actuator of claim 7 wherein said high-viscosity fluid is a fluorine oil.

12. The micro-actuator of claim 7 wherein said support members each have a plurality of first portions and a plurality of second portions, the average thickness of each said first portion being greater than the average thickness of each said second portion, said thicknesses being measured perpendicular to the direction of movement of said support members, the interconnection of said first and second portions defining reaction surfaces.

13. The micro-actuator of claim 7 wherein each of said support members further comprises a third portion located between each of said first and second portions, the thickness of said third portions being tapered from said first portion to the thickness of said second portion, the surfaces of said third portion comprising said reaction surfaces.

14. An electrostatic micro-actuator comprising:

a. an electrically insulating shell having a substantially cylindrical inner surface and a plurality of annular electrodes co-axial with said cylindrical inner surface of said shell;

b. an electrically insulating movable element co-axially received within said inner surface of said shell;
 (i) said movable element having a plurality of annular electrodes coaxial with said movable element,
 (ii) said movable element being induced to substantially linear motion by Coulomb forces acting between said movable element electrodes and said shell electrodes,
 (iii) said movable element having a first substantially cylindrical portion and a second substantially cylindrical portion, the diameter of said first portion being less than the average diameter of the inner surface of said shell and being greater than the average diameter of said second portion, the surface area of said movable element which interconnects said first and second portions defining a reaction surface; and c. a fluid having a high dielectric constant sealed within said cylindrical shell, said fluid surrounding said movable element, said fluid having a high-viscosity and cooperating with said movable element reaction surface during movement of said movable element to produce laminar flow of said fluid whereby the motion of said movable element is stabilized.

15. The electrostatic micro-actuator of claim 14 wherein said reaction surface is a substantially planar surface that faces substantially perpendicular to the direction of movement of said movable element.

16. The electrostatic micro-actuator of claim 14 wherein said reaction surface diverges outwardly from said second portion to said first portion whereby said reaction surface is angularly inclined relative to the direction of movement of said movable element.

17. The electrostatic micro-actuator of claim 14 wherein said high-viscosity fluid is a silicon oil.

18. The electrostatic micro-actuator of claim 14 wherein said high-viscosity fluid is a fluorine oil.

19. The electrostatic micro-actuator of claim 14 wherein said movable element further comprises a third portion located between said first and second portions, the diameter of said third portion increasing from said first portion to the diameter of said second portion, the surface of said third portion comprising said reaction surfaces of said movable element.

* * * * *